(12) United States Patent
Wang et al.

(10) Patent No.: US 10,248,240 B2
(45) Date of Patent: Apr. 2, 2019

(54) TOUCH SUBSTRATE AND METHOD FOR FORMING THE SAME, AND TOUCH DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Jing Wang, Beijing (CN); Ming Zhang, Beijing (CN); Xiaodong Xie, Beijing (CN); Min He, Beijing (CN); Dong Li, Beijing (CN)

(73) Assignees: BOE TECHNOLOGY GROUP CO., LTD., Beijing (CN); HEFEI XINSHENG OPTOELELCTRONICS TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 15/668,144

(22) Filed: Aug. 3, 2017

(65) Prior Publication Data

US 2018/0052553 A1    Feb. 22, 2018

(30) Foreign Application Priority Data

Aug. 17, 2016   (CN) .......................... 2016 1 0683036

(51) Int. Cl.
*G06F 3/044*    (2006.01)
*G06F 3/041*    (2006.01)
(Continued)

(52) U.S. Cl.
CPC .......... *G06F 3/0412* (2013.01); *G02F 1/1343* (2013.01); *G02F 1/13338* (2013.01);
(Continued)

(58) Field of Classification Search
CPC ..................................................... G06F 3/044
See application file for complete search history.

(56) References Cited

U.S. PATENT DOCUMENTS

2014/0375910 A1* 12/2014 Tada ...................... G06F 3/044
349/12
2015/0042908 A1*  2/2015 Wang ..................... G06F 3/044
349/12

* cited by examiner

*Primary Examiner* — Hang Lin
(74) *Attorney, Agent, or Firm* — Brooks Kushman P.C.

(57) ABSTRACT

A touch substrate and a method for forming the same, and a touch display device are provided, relating to the field of display technology. The touch substrate includes a touch region and a light-shielding region surrounding the touch region, a light-shielding pattern is arranged at the light-shielding region; the touch substrate further includes a first touch electrode and a second touch electrode crossing each other and insulated from each other and virtual electrodes at regions defined by the first touch electrode and the second touch electrode, and each virtual electrode is spaced apart from the first touch electrode and the second touch electrode; the first touch electrode, the second touch electrode and the virtual electrodes contact the light-shielding pattern; portions of adjacent virtual electrodes at the light-shielding region are connected to each other via a first bridge, the first bridge is insulated from the first touch electrode and the second touch electrode; and a first ground wire is arranged at the light-shielding region, and the first ground wire is electrically connected to the virtual electrodes connected to each other via the first bridge.

17 Claims, 5 Drawing Sheets

(51) Int. Cl.
*G02F 1/1333* (2006.01)
*G02F 1/1343* (2006.01)
(52) U.S. Cl.
CPC .............. *G06F 3/041* (2013.01); *G06F 3/044* (2013.01); *G06F 3/0416* (2013.01)

TOUCH SUBSTRATE AND METHOD FOR FORMING THE SAME, AND TOUCH DISPLAY DEVICE

CROSS-REFERENCE TO RELATED APPLICATION

This application claims a priority to Chinese Patent Application No. 201610683036.3 filed on Aug. 17, 2016, the disclosures of which are incorporated in their entirety by reference herein.

TECHNICAL FIELD

The present disclosure relates to the field of display technology, and in particular to a touch substrate and a method for forming the same, and a touch display device.

BACKGROUND

Ever since the springing-up of the touch technology, because the touch technology is simple, humanized and has a fast response, it is becoming more and more popular, and there are more and more products having the touch function in the market. The products include cell phones, tablet PC and laptop computers, etc.

At present, when manufacturing a touch device in the related art, firstly a shielding pattern may be formed at a light-shielding region of a touch substrate, and then first touch electrodes, second touch electrodes and virtual electrodes are formed. When manufacturing or using the touch device, electrostatic charges may accumulate at a region where the light-shielding pattern contacting the virtual electrodes. The electrostatic charges may puncture the light-shielding pattern after accumulating to a certain degree, and then the light-shielding pattern may become conductive consequently. As a result, a gap region may form a conductive channel, which may result in a micro-short circuiting, and finally the touch device may lose the touch function.

In the related art, in order to improve an anti-ESD (electro-static discharge) ability of the light-shielding region of the touch device, manufacturers of the touch device commonly adds an insulating layer (e.g., $SiO_2$) between the light-shielding pattern and the first touch electrodes, the second touch electrodes and the virtual electrodes, so as to prevent the micro-short circuiting of the light-shielding pattern when the light-shielding pattern is punctured. As such, although a probability of the ESD is reduced, a production cost may be increased due to the added insulating layer, and thus the product may be less competitive.

SUMMARY

A touch substrate and a method for forming the same, and a touch display device are provided in at least one embodiment of the present disclosure, so as to release the electrostatic charges in the virtual electrodes at the light-shielding region, and the production cost may be reduced in compared with the related art applying an insulating layer.

To achieve the above objective, a touch substrate is provided in at least one embodiment of the present disclosure, including a touch region and a light-shielding region surrounding the touch region, where a light-shielding pattern is arranged at the light-shielding region; the touch substrate further includes a first touch electrode and a second touch electrode crossing each other and insulated from each other and virtual electrodes at regions defined by the first touch electrode and the second touch electrode, and each virtual electrode is spaced apart from the first touch electrode and the second touch electrode; the first touch electrode, the second touch electrode and the virtual electrodes contact the light-shielding pattern; portions of adjacent virtual electrodes at the light-shielding region are connected to each other via a first bridge, where the first bridge is insulated from the first touch electrode and the second touch electrode; and a first ground wire is arranged at the light-shielding region, and the first ground wire is electrically connected to the virtual electrodes connected to each other via the first bridge.

Optionally, the first bridge is a metallic wire.

Optionally, the first touch electrode includes a plurality of first touch sub-electrodes connected to each other directly, the second touch electrode includes a plurality of second touch sub-electrodes spaced apart from each other, and the second touch sub-electrodes are connected to each other via a second bridge; and the first bridge is made of a material and arranged at a layer identical to the second bridge.

Optionally, the touch substrate further includes a third bridge, where the first ground wire is electrically connected via the third bridge to the virtual electrodes connected to each other via the first bridge; the third bridge is made of a material and arranged at a layer identical to the first bridge.

Optionally, the touch substrate further includes: a first insulating pattern between the first bridge and the first touch electrode; and a second insulating pattern at an overlapping region of the first touch electrode and the second touch electrode, where the first insulating pattern is made of a material and arranged at a layer identical to the second insulating pattern.

Optionally, each virtual electrode includes at least two virtual sub-electrodes, adjacent virtual sub-electrodes of each virtual electrode are spaced apart from each other; adjacent virtual sub-electrodes of each virtual electrode overlapping the light-shielding pattern, which overlap the light-shielding pattern, are connected to each other.

Optionally, the adjacent virtual sub-electrodes of each virtual electrode overlapping the light-shielding pattern, which overlap the light-shielding pattern, are connected to each other via a connection wire, where the connection wire is made of a material and arranged at a layer identical to the virtual electrodes.

Optionally, the first ground wire is at least connected to a portion of the virtual electrode nearest to the first ground wire at the light-shielding region.

Optionally, the touch substrate further includes: a first insulating pattern between the first bridge and the second touch electrode; and a second insulating pattern at an overlapping region of the first touch electrode and the second touch electrode, where the first insulating pattern is made of a material and arranged at a layer identical to the second insulating pattern.

Optionally, the first bridge is electrically connected to the virtual electrodes through via-holes in the first insulating layer.

Optionally, the first bridge contacts the virtual electrodes directly and is electrically connected to the virtual electrodes.

A touch display device is further provided in at least one embodiment of the present disclosure, including the above touch substrate.

Optionally, the touch display device further includes a second ground wire, where the second ground wire is connected to the first ground wire via a flexible print circuit (FPC).

A method for forming a touch substrate is further provided in at least one embodiment of the present disclosure, including: forming a light-shielding thin film on a base substrate, and patterning the light-shielding thin film to form a light-shielding pattern at a light-shielding region; forming a first conductive thin film and patterning the first conductive thin film to form a first conductive layer, where the first conductive layer includes a first touch electrode, a plurality of second touch sub-electrodes spaced apart from each other and virtual electrodes, where the virtual electrodes are arranged at regions defined by the first touch electrode and the second touch sub-electrodes; forming an insulating thin film, and patterning the insulating thin film to form a first insulating pattern between portions of adjacent virtual electrodes at the light-shielding region and a second insulating pattern arranged between adjacent second touch sub-electrodes and extending in a direction perpendicular to the first touch electrode; and forming a second conductive layer including a first bridge and a second bridge, where the first bridge is arranged on the first insulating pattern and configured to connect the portions of adjacent virtual electrodes at the light-shielding region to each other, and the second bridge is arranged on the second insulating pattern and configured to connect the adjacent second touch sub-electrodes to each other, where the virtual electrodes connected to each other via the first bridge are electrically connected to a first ground wire.

Optionally, the second conductive layer further includes a third bridge configured to connect the first ground wire to the virtual electrodes connected to each other via the first bridge.

Optionally, each virtual electrode includes at least two virtual sub-electrodes, and the first conductive layer further includes a connection wire configured to connect the adjacent virtual sub-electrodes of each virtual electrode overlapping the light-shielding pattern which overlap the light-shielding pattern to each other.

According to the touch substrate and the method for forming the same, and the touch display device in at least one embodiment of the present disclosure, the light-shielding pattern may be protected from being punctured and becoming conductive, and the micro-short circuiting caused by the conductive channel formed by the virtual electrodes and the gaps may be prevented, thereby reducing the adverse effect of electrostatic charges on the touch substrate.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

REFERENCE NUMBERS

01—light-shielding region; 02—touch region; 10—first touch electrode; 101—first touch sub-electrode; 20—second touch electrode; 201—second touch sub-electrode; 30—virtual electrode; 301—virtual sub-electrode; 40—gap; 50—light-shielding pattern; 60—first bridge; 70—first ground wire; 80—second bridge; 90—third bridge; 100—first insulating pattern; 110—second insulating pattern; 120—connection wire between adjacent virtual sub-electrodes.

DETAILED DESCRIPTION

The present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1A:
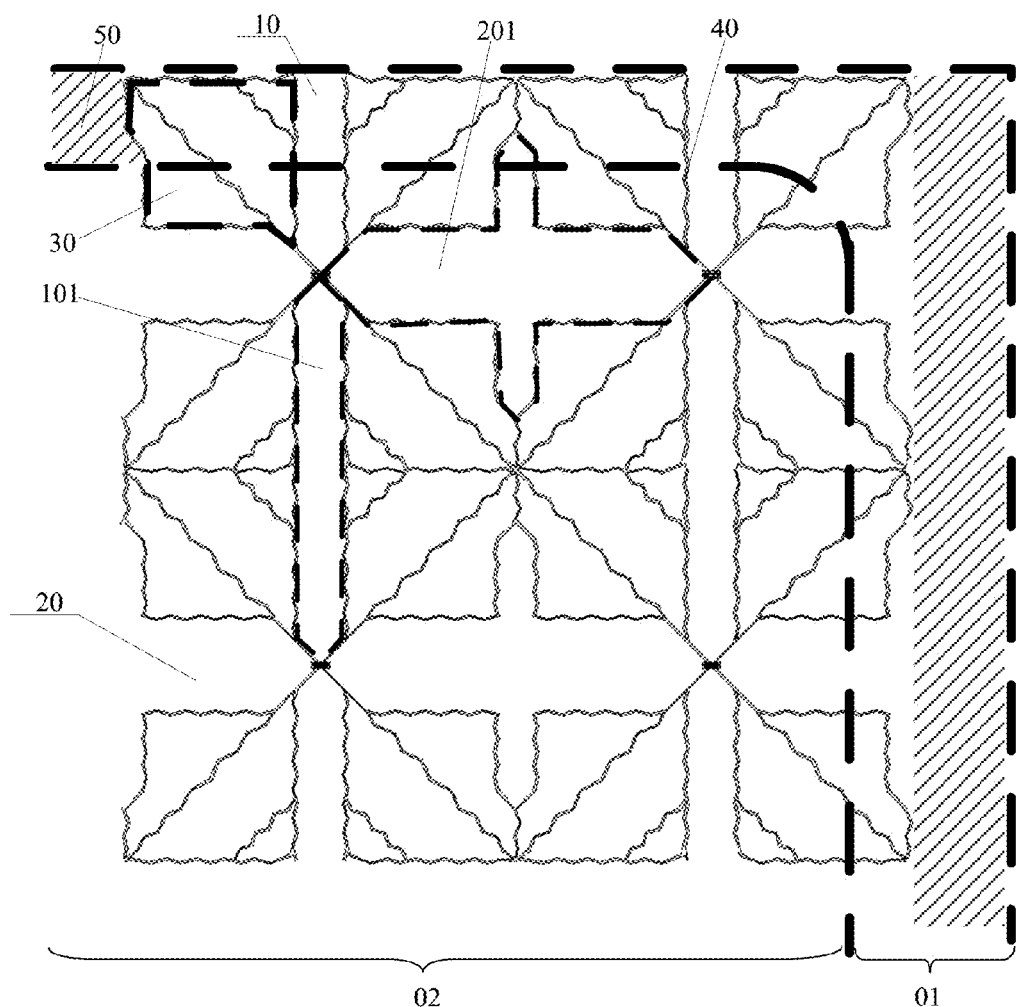
FIG. 1(a) is a schematic view of a touch substrate in the related art.

In the related art, as shown in FIG. 1(a), a touch device includes first touch electrodes 10 and second touch electrodes 20. Taking FIG. 1(a) for example, each first touch electrode 10 includes a plurality of first touch sub-electrodes 101 connected to each other directly, each second touch electrode 20 includes a plurality of second touch sub-electrodes 201 spaced apart from each other, and adjacent second touch sub-electrodes 201 are connected to each other via a bridge. An insulating layer is arranged between the bridge and the first touch electrode 10. In addition, in order to adjust a capacitance between the first touch electrode 10 and the second touch electrode 20, and to prevent a serious vanishing caused by light beams reflected by the gap between the first touch electrode 10 and the second touch electrode 20 when the touch display device is not lightened or lightened in a low gray level, virtual electrodes 30 may be arranged at regions defined by the first touch electrodes 10 and the second touch electrodes 20 when forming the touch device. The virtual electrodes 30 are separated from each other, and gaps 40 are between the virtual electrodes 30 and the first touch electrodes 10 and between the virtual electrodes 30 and the second touch electrodes 20.

Figure 1B:
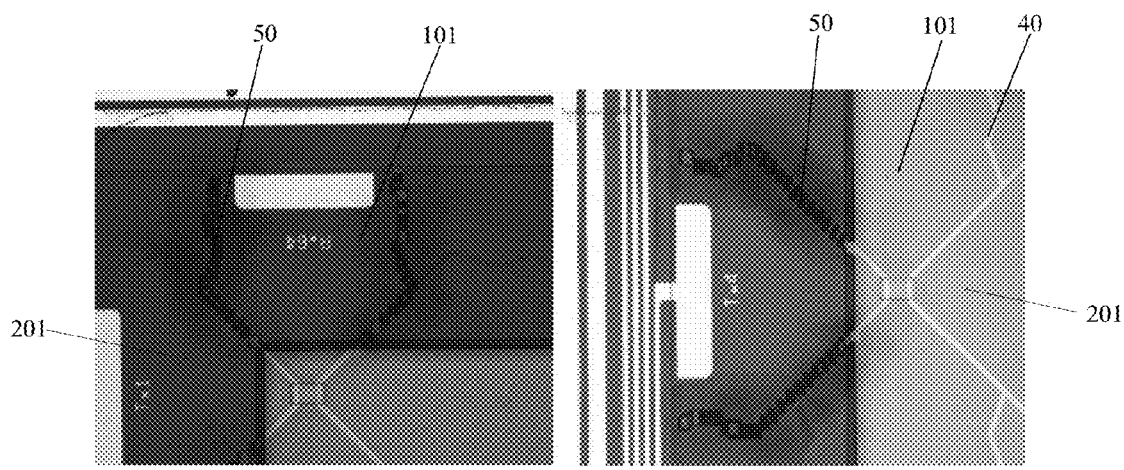
FIG. 1(b) is a schematic view of a touch substrate in which a light-shielding pattern is punctured in the related art.

When manufacturing a touch device in the related art, firstly a shielding pattern 50 (black matrix, shorten as BM) may be formed at a light-shielding region 01 of a touch substrate, and then first touch electrodes 10, second touch electrodes 20 and virtual electrodes 30 are formed. The first touch electrodes 10, the second touch electrodes 20 and the virtual electrodes 30 are all in contact with the light-shielding pattern 50 at the light-shielding region 01. When manufacturing or using the touch device, electrostatic charges may accumulate at a region where the light-shielding pattern 50 contacting the virtual electrodes 30. The electrostatic charges may puncture the light-shielding pattern 50 after accumulating to a certain degree, and then the light-shielding pattern 50 may become conductive consequently. As a result, as shown in FIG. 1(*b*), the region of the gap 40 may form a conductive channel, and then the first touch electrode 10 in different columns or the second touch electrode 20 in different rows may be shorted via the conductive channel formed by the gaps 40 and the virtual electrodes 30, and finally the touch device may lose the touch function.

In the related art, in order to improve an anti-ESD (electro-static discharge) ability of the light-shielding region 01 of the touch device, manufacturers of the touch device commonly adds an insulating layer (e.g., $SiO_2$) between the light-shielding pattern 50 and the first touch electrodes 10, the second touch electrodes 20 and the virtual electrodes 30, so as to prevent the micro-short circuiting of the light-shielding pattern 50 when the light-shielding pattern 50 is punctured. As such, although a probability of the ESD is reduced, a production cost may be increased due to the added insulating layer, and thus the product may be less competitive.

Figure 2:
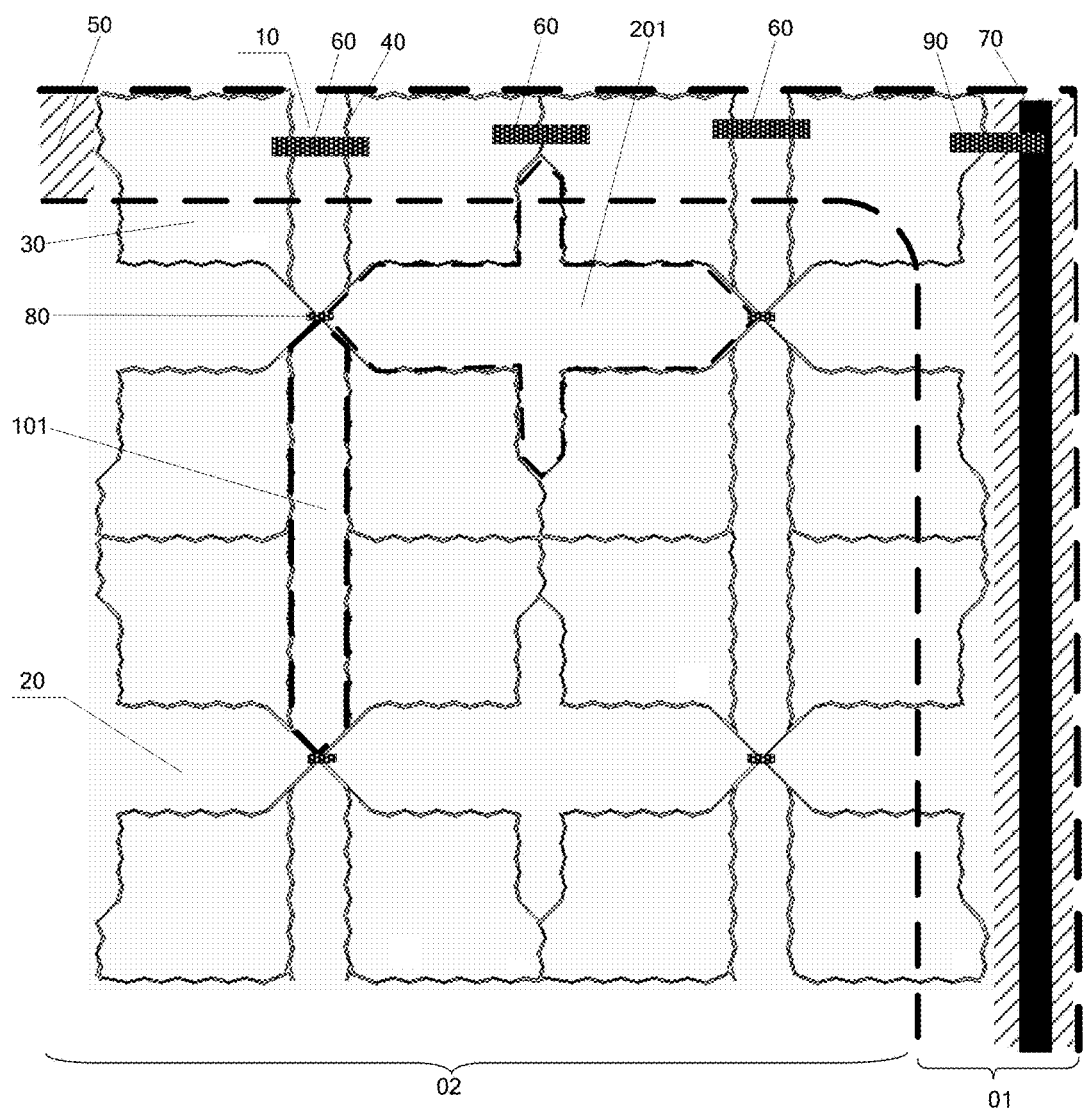
FIG. 2 is a schematic view of a touch substrate in at least one embodiment of the present disclosure.

A touch substrate is provided in at least one embodiment of the present disclosure. As shown in FIG. 2, the touch substrate includes a touch region 02 and a light-shielding region 01 surrounding the touch region 02, where a light-shielding pattern 50 is arranged at the light-shielding region 01. The touch substrate further includes a first touch electrode 10 and a second touch electrode 20 crossing each other and insulated from each other and virtual electrodes 30 at regions defined by the first touch electrode 10 and the second touch electrode 20, and each virtual electrode 30 is spaced apart from the first touch electrode 10 and the second touch electrode 20 by a gap 40. The first touch electrode 10, the second touch electrode 20 and the virtual electrodes 30 all contact the light-shielding pattern 50. Portions of adjacent virtual electrodes 30 at the light-shielding region 01 are connected to each other via a first bridge 60, where the first bridge 60 is insulated from the first touch electrode 10 and the second touch electrode 20. A first ground wire 70 is arranged at the light-shielding region 01, and the first ground wire 01 is electrically connected to the virtual electrodes 30 connected to each other via the first bridge 60.

It should be noted that, firstly, a material of the first bridge 60 is not limited, as long as the portions of adjacent virtual electrodes 30 at the light-shielding region 01 can be connected to each other and conducted via the first bridge 60.

Here, the first bridge 60 may connect the adjacent two virtual electrodes 30 at two sides of the first touch electrode 10 respectively to each other, and at this time, the first bridge 60 is arranged on the first touch electrode 10 and insulated from the first touch electrode 10. The first bridge 60 may also connect the adjacent two virtual electrodes 30 at two sides of the second touch electrode 20 respectively to each other, and at this time, the first bridge 60 is arranged on the second touch electrode 20 and insulated from the second touch electrode 20.

Based on the above, because the light-shielding region 01 is surrounding the touch region 02 and the light-shielding pattern 50 is arranged at a periphery of the touch region 02, periphery portions of the touch region 02 may be connected via the first bridges 60, and the portions of the virtual electrodes 30 at the light-shielding region 01 may be connected via the first bridges 60; or the portions of the touch region 02 at one side, two sides or three sides of the touch region 02 may be connected via the first bridges 60, and the portions of the virtual electrodes 30 at the light-shielding region 01 may be connected via the first bridges 60, which is not limited herein.

Secondly, types of the first touch electrode 10 and the second touch electrode 20 are not limited. For example, the first touch electrode 10 is a drive electrode, and the second touch electrode 20 is a sensing electrode; or the first touch electrode 10 is a sensing electrode, and the second touch electrode 20 is a drive electrode.

In addition, shapes and sizes of the first touch electrode 10 and the second touch electrode 20 are not limited, which may be designed based on a practical requirement (e.g., touch accuracy) and an applicable integrate circuit (IC).

Thirdly, the portions of the virtual electrodes 30 at the light-shielding region 01 are connected to each other via the first bridges 60 to form a channel. In order to release the electrostatic charges in the channel to the first ground wire 70, the channel needs to be connected to the first ground wire 70. The way of connect the first ground wire 70 to the channel formed by the virtual electrodes 30 is not limited herein. For example, when forming the virtual electrodes 30, the portion of the virtual electrode 30, which is at the light-shielding region 01 and close to the first ground wire 70, may be extended to form a connection wire, so as to connect the virtual electrodes 30 to the first ground wire 70; or a connection wire may be arranged to connect the virtual electrodes 30 to the first ground wire 70 after forming the virtual electrodes 30.

Fourthly, in at least one embodiment of the present disclosure, the first touch electrodes 10 may be perpendicular to the second touch electrodes 20 substantially.

Fifthly, the first ground wire 70 may be connected to any one of the virtual electrodes 30 which are connected to each other via the first bridges 60.

According to the touch substrate in at least one embodiment of the present disclosure, the portions of adjacent virtual electrodes 30 at the light-shielding region 01 are connected to each other via the first bridges 60 to form a channel, and the first ground wire 70 is connected to the virtual electrodes 30 which are connected to each other via the first bridges 60, therefore the electrostatic charges in the virtual electrodes 30 at the light-shielding region 01 may be released to the first ground wire 70 via the channel, thereby protecting the light-shielding pattern 50 from being punctured and becoming conductive, and preventing the micro-short circuiting caused by the conductive channel formed by the virtual electrodes 30 and the gaps 40, and reducing the adverse effect of electrostatic charges on the touch substrate. In the present disclosure, the first bridge 60 is merely arranged between the portions of adjacent virtual electrodes 30 at the light-shielding region 01 and the first ground wire 70 is connected to the virtual electrodes 30 which are connected to each other via the first bridge 60. According to the touch substrate in at least one embodiment of the present disclosure, the production cost may be reduced and the product may be more competitive in compared with the related art where an insulating layer is arranged between the light-shielding pattern 50 and the first touch electrodes 10, the second touch electrodes 20 and the virtual electrodes 30.

Because a metallic wire has a small resistance and may release the electrostatic charges rapidly, optionally the first bridge 60 is a metallic wire, and thus the electrostatic charges in the virtual electrodes 30 may be released to the first ground wire 70 rapidly via the first bridge 60, thereby avoiding the electrostatic charges from accumulating in the virtual electrodes 30.

Optionally, as shown in FIG. 2, the first touch electrode 10 includes a plurality of first touch sub-electrodes 101 connected to each other directly, the second touch electrode 20 includes a plurality of second touch sub-electrodes 201 spaced apart from each other, and the second touch sub-electrodes 201 are connected to each other via a second bridge 80. The first bridge 60 is made of a material and arranged at a layer identical to the second bridge 80.

It should be noted that, when forming the touch substrate, the first touch sub-electrodes 101 are connected to each other to form the first touch electrode 10, the second touch sub-electrodes 201 are spaced apart from each other and are connected to each other via the second bridges 80 to form the second touch electrode 20. Because the first bridge 60 is made of a material and arranged at a layer identical to the second bridge 80, the first bridge 60 and the second bridge 80 may be formed simultaneously, thereby reducing the manufacturing period of the product and reducing the production cost.

Optionally, as shown in FIG. 2, the touch substrate further includes a third bridge 90, the first ground wire 70 is electrically connected via the third bridge 90 to the virtual electrodes 30 connected to each other via the first bridge 60, and the third bridge 90 is made of a material and arranged at a layer identical to the first bridge 60.

In the case that during forming the virtual electrodes 30, the portion of the virtual electrode 30, which is at the light-shielding region 01 and close to the first ground wire 70, is extended to form a connection wire, to connect the virtual electrodes 30 to the first ground wire 70, because the virtual electrode 30 is generally made of indium tin oxide (ITO) and the ITO material has a large resistance, it is difficult to release via through the ITO material the electrostatic charges in the channel formed after the portion of the virtual electrode 30 at the light-shielding region 01 is connected to the first wire electrode 70. In view of this, in at least one embodiment of the present disclosure, the first ground wire 70 is electrically connected via the third bridge 90 to the virtual electrodes 30 connected to each other via the first bridge 60. Because the third bridge 90 is made of a material and arranged at a layer identical to the first bridge 60, the first bridge 60 and the third bridge 90 may be formed simultaneously, thereby reducing the manufacturing period of the product and reducing the production cost. In addition, because the first bridge 60 is generally made of a metallic wire, so the third bridge 90 is also made of a metallic wire. Therefore, the electrostatic charges in the channel formed by the portion of the virtual electrode 30 at the light-shielding region 01 may be released rapidly via the third bridge 90, thereby preventing the electrostatic charges from accumulating in the virtual electrodes 30.

Figure 3A:
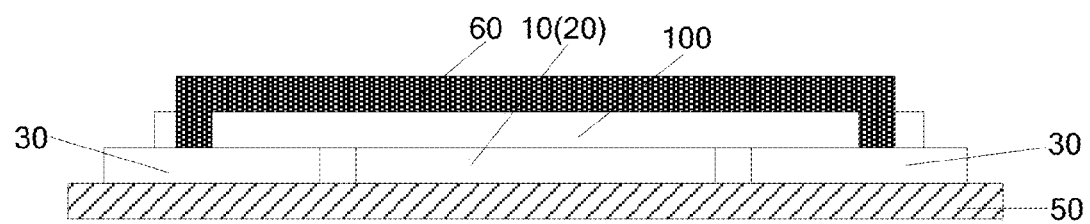
FIG. 3(a) is a schematic view of a touch substrate in which a first insulating pattern is arranged between a first bridge and a first touch electrode or a second touch electrode in at least one embodiment of the present disclosure.
Figure 3B:
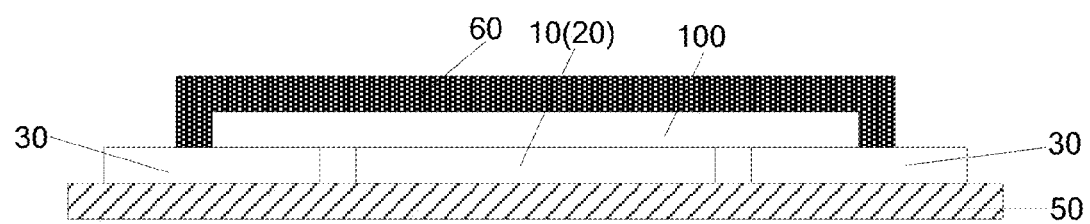
FIG. 3(b) is a schematic view of a touch substrate in which a first insulating pattern is arranged between a first bridge and a first touch electrode or a second touch electrode in at least one embodiment of the present disclosure.
Figure 3C:
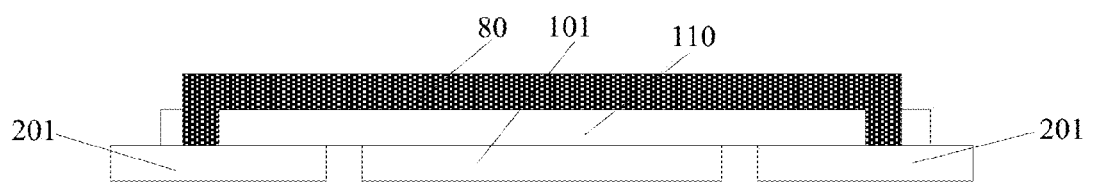
FIG. 3(c) is a schematic view of a touch substrate in which a second bridge and a second insulating pattern are arranged at an overlapping region of a first touch electrode and a second touch electrode in at least one embodiment of the present disclosure.

Optionally, as shown in FIGS. 3(a), 3(b) and 3(c), the touch substrate includes a first insulating pattern 100 between the first bridge 60 and the first touch electrode 10 or the second touch electrode 20 and a second insulating pattern 110 at an overlapping region of the first touch electrode 10 and the second touch electrode 20. The first insulating pattern 100 is made of a material and arranged at a layer identical to the second insulating pattern 110.

It should be noted that, when the first bridge 60 is arranged on the first touch electrode 10 and configured to connect the adjacent two virtual electrodes 30 at two sides of the first touch electrode 10 respectively to each other, the first insulating pattern 100 is arranged between the first bridge 60 and the first touch electrode 10. When the first bridge 60 is arranged on the second touch electrode 20 and configured to connect the adjacent two virtual electrodes 30 at two sides of the second touch electrode 20 respectively to each other, the first insulating pattern 100 is arranged between the first bridge 60 and the second touch electrode 20.

For example, as shown in FIG. 3(a), the first bridge 60 may be connected to the portion of the virtual electrode 30 at the light-shielding region 01 through via-holes in the first insulating pattern 100, or as shown in FIG. 3(b), the first bridge 60 may be connected to the virtual electrode 30 directly, as long as the first bridge 60 is insulated from the first touch electrode 10 and the second touch electrode 20.

Similarly, as shown in FIG. 3(c), the second bridge 80 may be connected to the second touch sub-electrode 201 through via-holes in the second insulating layer 110, or the second bridge 80 may be connected to the second touch sub-electrode 201 directly (not shown in the drawings), as long as the second bridge 80 is insulated from the first touch sub-electrode 101.

According to the touch substrate in at least one embodiment of the present disclosure, the first touch electrode 10 and the second touch electrode 20 are crossing each other, in order to insulate the first touch electrode 10 from the second touch electrode 20, the second insulating pattern 110 may be arranged at an overlapping region of the first touch electrode 10 and the second touch electrode 20, so the first insulating pattern 100 and the second insulating pattern 110 may be formed simultaneously, thereby reducing the manufacturing period of the product and reducing the production cost.

Figure 4:
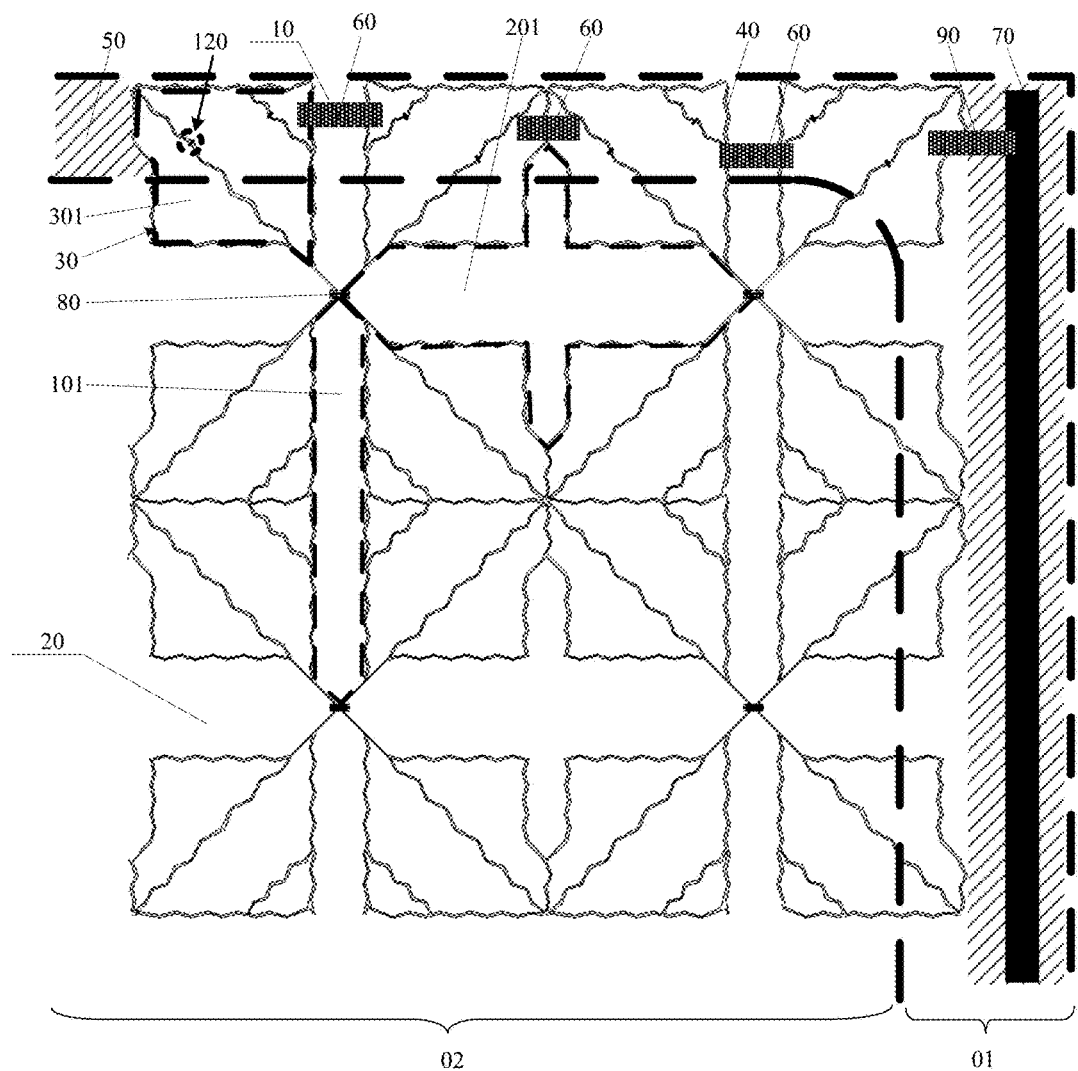
FIG. 4 is a schematic view of a virtual electrode including two virtual sub-electrodes.

Optionally, as shown in FIG. 4, each virtual electrode 30 includes at least two virtual sub-electrodes 301, adjacent virtual sub-electrodes 301 of each virtual electrode 30 are spaced apart from each other. Adjacent virtual sub-electrodes 301 of each virtual electrode 30 overlapping the light-shielding pattern 50, which overlap the light-shielding pattern 50, are connected to each other.

The virtual electrode 30 is divided into at least two virtual sub-electrodes 301, and the virtual sub-electrodes 301 are spaced apart from each other by the gap 40, therefore, in compare with the virtual electrode 30 including one virtual sub-electrode 301, there may be more gaps 40 in the virtual electrode 30. Therefore, a touch display device including the above touch substrate may prevent a regular reflection, thereby further restraining the vanishing.

The number of the virtual sub-electrodes 301 in each virtual electrode 30 is not limited, which may be greater than two. However, in view of that the virtual sub-electrode 301 is not large, when there are many virtual sub-electrodes 301, it is difficult to form the virtual sub-electrode 301, and the vanishing may not be restrained effectively. Therefore, in a practical application, the number of the virtual sub-electrodes 301 in each virtual electrode 30 may be determined based on the vanishing effect.

In addition, the way of connecting adjacent virtual sub-electrodes 301 of each virtual electrode 30 overlapping the light-shielding pattern 50 is not limited. Adjacent virtual sub-electrodes 301 of each virtual electrode 30 overlapping the light-shielding pattern 50, which overlap the light-shielding pattern 50, may be connected to each other directly, when forming the virtual sub-electrodes 301; or adjacent virtual sub-electrodes 301 of each virtual electrode 30 overlapping the light-shielding pattern 50, which overlap the light-shielding pattern 50, may be connected to each other via a connection wire, after forming the virtual sub-electrodes 301.

Based on the above, in the touch region 02, whether the virtual sub-electrodes 301 of each virtual electrode 30 is connected to each other, is not limited.

According to the touch substrate in at least one embodiment of the present disclosure, when each virtual electrode 30 includes more than two virtual sub-electrodes 301, adjacent virtual sub-electrodes 301 of each virtual electrode 30 overlapping the light-shielding pattern 50, which overlap the light-shielding pattern 50, are connected to each other, therefore the electrostatic charges in the virtual electrodes 30 at the light-shielding region 01 may be released via the channel formed by the virtual electrodes 30 at the light-shielding region 01, thereby protecting the light-shielding pattern 50 from being punctured by the electrostatic charges.

Optionally, as shown in FIG. 4, the adjacent virtual sub-electrodes 301 of each virtual electrode 30 overlapping the light-shielding pattern 50, which overlap the light-shielding pattern 50, are connected to each other via a connection wire 120, and the connection wire 120 is made of a material and arranged at a layer identical to the virtual electrodes 30.

According to the touch substrate in at least one embodiment of the present disclosure, the connection wire 120, which connects the virtual sub-electrodes 301 overlapping the light-shielding pattern 50, is made of a material and arranged at a layer identical to the virtual electrodes 30. Therefore, when forming the virtual electrodes 30, the adjacent virtual sub-electrodes 301 of each virtual electrode 30 overlapping the light-shielding pattern 50, which overlap the light-shielding pattern 50, may be connected to each other directly, thereby simplifying the manufacturing process of the touch substrate, reducing the manufacturing period thereof, and increasing the production efficiency.

In order to simplify the manufacturing process of the touch substrate, connect the first ground wire 70 to the portion of the virtual electrode 30 at the light-shielding region 01 and shorten the connection wire between the first ground wire 70 and the virtual electrode 30, optionally the first ground wire 70 is at least connected to a portion of the virtual electrode 30 nearest to the first ground wire 70 at the light-shielding region 01.

A touch display device including the above touch substrate is further provided in at least one embodiment of the present disclosure.

It should be noted that, the types of the touch display device in at least one embodiment of the present disclosure is not limited. The touch display device may be a liquid crystal display device, an organic light-emitting diode display device or other types of display device.

When the touch display device is a liquid crystal display device, the touch display device includes an array substrate and an opposite substrate. The array substrate includes a thin film transistor and pixel electrodes. The color film layer may be arranged on the array substrate or the opposite substrate. At this time, the touch substrate may be the array substrate or the opposite substrate. When the touch display device is an OLED display device, the OLED display device includes an array substrate and an encapsulation substrate. The array substrate may include a thin film transistor, an anode connected to a drain electrode of the thin film transistor, a cathode and an organic functional layer. At this time, the touch substrate may be an array substrate or an encapsulation substrate.

According to the touch display device in at least one embodiment of the present disclosure, the touch display device includes a touch substrate, the portions of adjacent virtual electrodes 30 at the light-shielding region 01 are connected to each other via the first bridges 60 to form a channel, and the first ground wire 70 is connected to the virtual electrodes 30 which are connected to each other via the first bridges 60, therefore the electrostatic charges in the virtual electrodes 30 at the light-shielding region 01 may be released to the first ground wire 70 via the channel, thereby protecting the light-shielding pattern 50 from being punctured and becoming conductive, and preventing the micro-short circuiting caused by the conductive channel formed by the virtual electrodes 30 and the gaps 40, and solving the adverse effect of electrostatic charges on the touch substrate. In the present disclosure, the first bridge 60 is merely arranged between the portions of adjacent virtual electrodes 30 at the light-shielding region 01 and the first ground wire 70 is connected to the virtual electrodes 30 which are connected to each other via the first bridge 60. According to the touch substrate in at least one embodiment of the present disclosure, the production cost may be reduced and the product may be more competitive in compared with the related art where an insulating layer is arranged between the light-shielding pattern 50 and the first touch electrodes 10, the second touch electrodes 20 and the virtual electrodes 30.

In order protect the display device and the user, a ground wire is commonly arranged in the touch display device. Therefore, in at least one embodiment of the present disclosure, the touch display device include a second ground wire (not shown in the drawings), and the second ground wire is connected to the first ground wire 70 via a FPC.

A ground wire is arranged in the FPC, so an end of the ground wire in the FPC may be connected to the second ground wire, and the other end thereof is connected to the first ground wire 70, and thus the electrostatic charges in the first ground wire 70 may be released to the second ground wire so as to release the electrostatic charges.

According to the touch display device in at least one embodiment of the present disclosure, the electrostatic charges in the virtual electrodes 30 connected to each other via the first bridges 60 may be released to the first ground wire 70, and the first ground wire 70 is connected to the second ground wire via the FPC, so the electrostatic charges may be released to the second ground wire, thereby releasing the electrostatic charges and avoiding the adverse effect of the electrostatic charges on the touch display device.

Figure 5:
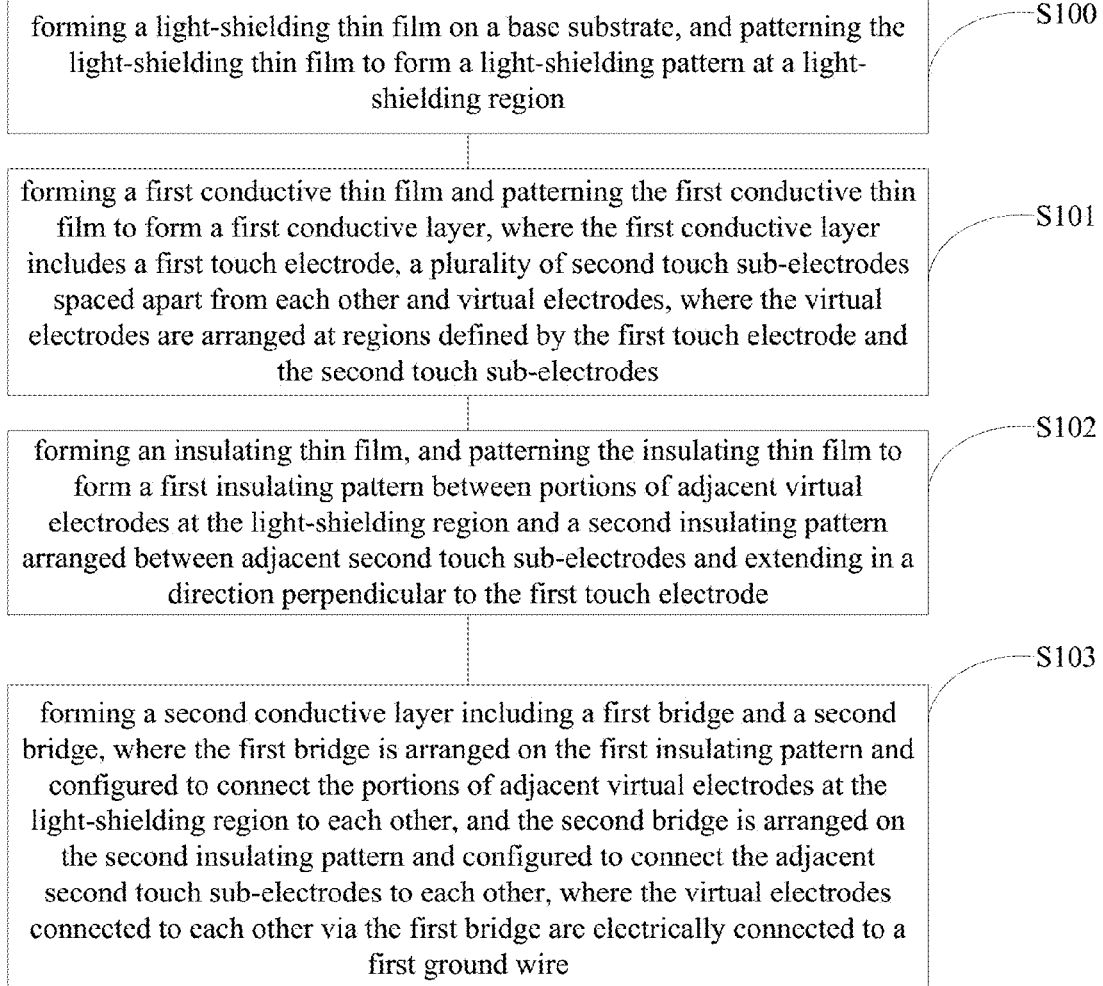
FIG. 5 is a flow chart of a method for forming a touch substrate.

A method for forming a touch substrate is further provided in at least one embodiment of the present disclosure. As shown in FIG. 5, the method includes:

Step 100: forming a light-shielding thin film on a base substrate, and patterning the light-shielding thin film to form a light-shielding pattern 50 at a light-shielding region 01.

A material of the light-shielding thin film is not limited, as long as light may be shielded by the light-shielding thin film. For example, the light-shielding thin film may be a printing ink.

Step 101: forming a first conductive thin film and patterning the first conductive thin film to form a first conductive layer, where the first conductive layer includes a first touch electrode 10, a plurality of second touch sub-electrodes 201 spaced apart from each other and virtual electrodes 30, where the virtual electrodes 30 are arranged at regions defined by the first touch electrode 10 and the second touch sub-electrodes 201.

Shapes and sizes of the first touch electrode 10 and the second touch electrode 20 are not limited, which may be designed based on a practical requirement (e.g., touch accuracy) and an applicable integrate circuit (IC). Based on this, a shape and size of the virtual electrode 30 may be designed based on sizes of the first touch electrode 10 and the second touch sub-electrodes 201.

A material of a first conductive thin film is not limited, as long as the material is a transparent and conductive material.

For example, the first conductive thin film may be made of ITO or indium zinc oxide (IZO).

It should be noted that, the first touch electrode 10 includes a plurality of first touch sub-electrode 101 connected to each other directly.

In addition, the first touch electrode 10, the second touch sub-electrode 201 and the virtual electrode 30 may be formed simultaneously by one patterning process.

Step 102: forming an insulating thin film, and patterning the insulating thin film to form a first insulating pattern 100 between portions of adjacent virtual electrodes 30 at the light-shielding region 01 and a second insulating pattern 110 arranged between adjacent second touch sub-electrodes 201 and extending in a direction perpendicular to the first touch electrode 10.

The first insulating pattern 100 and the second insulating pattern 110 may be formed simultaneously by one patterning process.

Step 103: forming a second conductive layer including a first bridge 60 and a second bridge 80, where the first bridge 60 is arranged on the first insulating pattern 100 and configured to connect the portions of adjacent virtual electrodes 30 at the light-shielding region 01 to each other, and the second bridge 80 is arranged on the second insulating pattern 110 and configured to connect the adjacent second touch sub-electrodes 201 to each other, where the virtual electrodes 30 connected to each other via the first bridge 60 are electrically connected to a first ground wire 70.

A material of the second conductive layer is not limited. In order to guarantee a good conductivity of the adjacent virtual electrodes 30 connected to each other via the first bridge 60 and a good conductivity of the second touch sub-electrodes 201 connected to each other via the second bridge 80, optionally the first bridge 60 and the second bridge 80 are made of a metallic material.

The way of connecting the first ground wire 70 to the channel formed by the virtual electrodes 30 is not limited herein. For example, when forming the virtual electrodes 30, the portion of the virtual electrode 30, which is at the light-shielding region 01 and close to the first ground wire 70, may be extended to form a connection wire, so as to connect the virtual electrodes 30 to the first ground wire 70; or a connection wire may be arranged to connect the virtual electrodes 30 to the first ground wire 70 after forming the virtual electrodes 30.

It should be noted that, the first bridge 60 and the second bridge 80 may be formed by one patterning process, or the first bridge 60 may be formed on the first insulating pattern 100 by an evaporation process, meanwhile the second bridge 80 may be formed on the second insulating pattern 110 by an evaporation process, and a detailed description thereof is omitted herein.

According to the method for forming the touch substrate in at least one embodiment of the present disclosure, the portions of adjacent virtual electrodes 30 at the light-shielding region 01 are connected to each other via the first bridges 60 to form a channel, and the first ground wire 70 is connected to the virtual electrodes 30 which are connected to each other via the first bridges 60, therefore the electrostatic charges in the virtual electrodes 30 at the light-shielding region 01 may be released to the first ground wire 70 via the channel, thereby protecting the light-shielding pattern 50 from being punctured and becoming conductive, and preventing the micro-short circuiting caused by the conductive channel formed by the virtual electrodes 30 and the gaps 40, and solving the adverse effect of electrostatic charges on the touch substrate. In the present disclosure, the first bridge 60 is merely arranged between the portions of adjacent virtual electrodes 30 at the light-shielding region 01 and the first ground wire 70 is connected to the virtual electrodes 30 which are connected to each other via the first bridge 60. According to the touch substrate in at least one embodiment of the present disclosure, the production cost may be reduced and the product may be more competitive in compared with the related art where an insulating layer is arranged between the light-shielding pattern 50 and the first touch electrodes 10, the second touch electrodes 20 and the virtual electrodes 30.

Optionally, the second conductive layer further includes a third bridge 90 configured to connect the first ground wire 70 to the virtual electrodes 30 connected to each other via the first bridge 60.

The first bridge 60, the second bridge 80 and the third bridge 90 may be formed simultaneously by one patterning process or one evaporation process.

According to at least one embodiment of the present disclosure, the first bridge 60, the second bridge 80 and the third bridge 90 may be formed simultaneously. On one hand, the manufacturing period of the product and the production cost may be reduced. On the other hand, because the first bridge 60 is generally made of a metallic wire, so the third bridge 90 is also made of a metallic wire. Therefore, the electrostatic charges in the channel formed by the portion of the virtual electrode 30 at the light-shielding region 01 may be released rapidly via the third bridge 90.

Optionally, each virtual electrode 30 includes at least two virtual sub-electrodes 301. The first conductive layer further includes a connection wire 120 connecting adjacent virtual sub-electrodes 301 of each virtual electrode 30 overlapping the light-shielding pattern 50.

The number of the virtual sub-electrodes 301 in each virtual electrode 30 is not limited, which may be greater than two.

Based on the above, in the touch region 02, whether the virtual sub-electrodes 301 of each virtual electrode 30 is connected to each other, is not limited.

According to at least one embodiment of the present disclosure, when each virtual electrode 30 includes more than two virtual sub-electrodes 301, adjacent virtual sub-electrodes 301 of each virtual electrode 30 overlapping the light-shielding pattern 50, which overlap the light-shielding pattern 50, are connected to each other, therefore the electrostatic charges in the virtual electrodes 30 at the light-shielding region 01 may be released via the channel formed by the virtual electrodes 30 at the light-shielding region 01, thereby protecting the light-shielding pattern 50 from being punctured by the electrostatic charges. Based on this, when forming the virtual electrodes 30, the adjacent virtual sub-electrodes 301 of each virtual electrode 30 overlapping the light-shielding pattern 50 may be connected to each other directly, thereby simplifying the manufacturing process of the touch substrate, reducing the manufacturing period thereof, and increasing the production efficiency.

The above are merely some embodiments of the present disclosure. A person skilled in the art may make further modifications and improvements without departing from the principle of the present disclosure, and these modifications and improvements shall also fall within the scope of the present disclosure.

What is claimed is:
1. A touch substrate, comprising a touch region and a light-shielding region surrounding the touch region, wherein a light-shielding pattern is at the light-shielding region;

the touch substrate further comprises a first touch electrode and a second touch electrode crossing each other and insulated from each other and virtual electrodes at regions defined by the first touch electrode and the second touch electrode, and each virtual electrode is spaced apart from the first touch electrode and the second touch electrode;

the first touch electrode, the second touch electrode and the virtual electrodes contact the light-shielding pattern directly;

the virtual electrodes are separated from each other, and portions of adjacent virtual electrodes at the light-shielding region are connected to each other via a first bridge, wherein the first bridge is insulated from the first touch electrode and the second touch electrode;

a first ground wire is at the light-shielding region, and the first ground wire is electrically connected to the virtual electrodes connected to each other via the first bridge; and orthographic projections of the virtual electrodes onto a plane where the first touch electrode and the second touch electrode are located do not overlap the first touch electrode and the second touch electrode.

2. The touch substrate according to claim 1, wherein the first bridge is a metallic wire.

3. The touch substrate according to claim 1, wherein the first touch electrode comprises a plurality of first touch sub-electrodes connected to each other directly, the second touch electrode comprises a plurality of second touch sub-electrodes spaced apart from each other, and the second touch sub-electrodes are connected to each other via a second bridge; and the first bridge is made of a material and arranged at a layer identical to the second bridge.

4. The touch substrate according to claim 1, further comprising a third bridge, wherein the first ground wire is electrically connected via the third bridge to the virtual electrodes connected to each other via the first bridge;

the third bridge is made of a material and arranged at a layer identical to the first bridge.

5. The touch substrate according to claim 1, further comprising:

a first insulating pattern between the first bridge and the first touch electrode; and a second insulating pattern at an overlapping region of the first touch electrode and the second touch electrode;

wherein the first insulating pattern is made of a material and arranged at a layer identical to the second insulating pattern.

6. The touch substrate according to claim 1, wherein each virtual electrode comprises at least two virtual sub-electrodes, adjacent virtual sub-electrodes of each virtual electrode are spaced apart from each other;

adjacent virtual sub-electrodes of each virtual electrode overlapping the light-shielding pattern, which overlap the light-shielding pattern, are connected to each other.

7. The touch substrate according to claim 6, wherein the adjacent virtual sub-electrodes of each virtual electrode overlapping the light-shielding pattern, which overlap the light-shielding pattern, are connected to each other via a connection wire, wherein the connection wire is made of a material and arranged at a layer identical to the virtual electrodes.

8. The touch substrate according to claim 1, wherein the first ground wire is at least connected to a portion of the virtual electrode nearest to the first ground wire at the light-shielding region.

9. The touch substrate according to claim 1, further comprising:

a first insulating pattern between the first bridge and the second touch electrode; and a second insulating pattern at an overlapping region of the first touch electrode and the second touch electrode;

wherein the first insulating pattern is made of a material and arranged at a layer identical to the second insulating pattern.

10. The touch substrate according to claim 5, wherein the first insulating pattern is further arranged between the first bridge and the second touch electrode.

11. The touch substrate according to claim 5, wherein the first bridge is electrically connected to the virtual electrodes through via-holes in the first insulating layer.

12. The touch substrate according to claim 5, wherein the first bridge contacts the virtual electrodes directly and is electrically connected to the virtual electrodes.

13. A touch display device, comprising the touch substrate according to claim 1.

14. The touch display device according to claim 13, further comprising a second ground wire, wherein the second ground wire is connected to the first ground wire via a flexible print circuit (FPC).

15. A method for forming a touch substrate, comprising:

forming a light-shielding thin film on a base substrate, and patterning the light-shielding thin film to form a light-shielding pattern at a light-shielding region;

forming a first conductive thin film and patterning the first conductive thin film to form a first conductive layer, wherein the first conductive layer comprises a first touch electrode, a plurality of second touch sub-electrodes spaced apart from each other and virtual electrodes, wherein the virtual electrodes are at regions defined by the first touch electrode and the second touch sub-electrodes, and the first touch electrode, the second touch electrode and the virtual electrodes contact the light-shielding pattern directly;

forming an insulating thin film, and patterning the insulating thin film to form a first insulating pattern between portions of adjacent virtual electrodes at the light-shielding region and a second insulating pattern arranged between adjacent second touch sub-electrodes and extending in a direction perpendicular to the first touch electrode; and forming a second conductive layer comprising a first bridge and a second bridge, wherein the first bridge is arranged on the first insulating pattern and configured to connect the portions of adjacent virtual electrodes at the light-shielding region to each other, and the second bridge is arranged on the second insulating pattern and configured to connect the adjacent second touch sub-electrodes to each other, wherein the virtual electrodes connected to each other via the first bridge are electrically connected to a first ground wire;

wherein the virtual electrodes are separated from each other, and orthographic projections of the virtual electrodes onto a plane where the first touch electrode and the second touch electrode are located do not overlap the first touch electrode and the second touch electrode.

16. The method according to claim 15, wherein the second conductive layer further comprises a third bridge configured to connect the first ground wire to the virtual electrodes connected to each other via the first bridge.

17. The method according to claim 15, wherein each virtual electrode comprises at least two virtual sub-electrodes;

wherein the first conductive layer further comprises a connection wire configured to connect the adjacent virtual sub-electrodes of each virtual electrode overlapping the light-shielding pattern which overlap the light-shielding pattern to each other.

* * * * *